(12) United States Patent
Jeong

(10) Patent No.: US 12,202,325 B2
(45) Date of Patent: Jan. 21, 2025

(54) BODY FOR VEHICLE

(71) Applicants: Hyundai Motor Company, Seoul (KR); Kia Corporation, Seoul (KR)

(72) Inventor: Seung Min Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 425 days.

(21) Appl. No.: 17/848,202

(22) Filed: Jun. 23, 2022

(65) Prior Publication Data

US 2022/0314780 A1    Oct. 6, 2022

Related U.S. Application Data

(63) Continuation-in-part of application No. 17/028,903, filed on Sep. 22, 2020, now Pat. No. 11,400,986.

(30) Foreign Application Priority Data

Mar. 24, 2020 (KR) .................. 10-2020-0035848

(51) Int. Cl.
*B60K 1/04* (2019.01)
*B62D 21/02* (2006.01)
*B62D 21/15* (2006.01)
*B62D 25/02* (2006.01)
*B62D 25/20* (2006.01)

(52) U.S. Cl.
CPC ............... *B60K 1/04* (2013.01); *B62D 21/02* (2013.01); *B62D 21/15* (2013.01); *B62D 25/025* (2013.01); *B62D 25/2018* (2013.01); *B62D 25/2036* (2013.01); *B60K 2001/0438* (2013.01)

(58) Field of Classification Search
CPC .. B60K 1/04; B60K 2001/0438; B62D 21/02; B62D 21/15
See application file for complete search history.

(56) References Cited

U.S. PATENT DOCUMENTS

| 6,227,322 B1 * | 5/2001 | Nishikawa ............. B60R 16/04 180/68.5 |
| 9,499,205 B1 | 11/2016 | Elia et al. |
| 11,292,326 B2 * | 4/2022 | McCarron ............... B60K 1/02 |
| 11,400,986 B2 | 8/2022 | Jeong |
| 11,511,612 B2 * | 11/2022 | Jeon ...................... B62D 25/20 |

(Continued)

FOREIGN PATENT DOCUMENTS

| JP | 4384206 B2 | 12/2009 |
| JP | 2019-133866 | 8/2019 |

(Continued)

*Primary Examiner* — Erez Gurari
(74) *Attorney, Agent, or Firm* — Morgan, Lewis & Bockius LLP

(57) ABSTRACT

A body for a vehicle configured for securing safety performance and vehicle rigidity according to a vehicle collision while increasing a battery capacity mounted in the vehicle, may include an internal side member mounted on a center floor in a longitudinal direction of the body; a battery cross member mounted in a width direction of the body inside a battery case provided at a lower end portion of the center floor while intersecting the internal side member; and a coupling structure coupled to the battery case, the battery cross member, and the center floor.

13 Claims, 11 Drawing Sheets

(56) References Cited

U.S. PATENT DOCUMENTS

| | | | | |
|---|---|---|---|---|
| 11,752,853 | B2* | 9/2023 | Inoue | B60K 1/04 |
| | | | | 180/68.5 |
| 11,807,302 | B2* | 11/2023 | Harmon | B62D 21/03 |
| 11,851,110 | B2* | 12/2023 | Hirota | B62D 27/026 |
| 12,126,038 | B2* | 10/2024 | Hashida | H01M 50/249 |
| 2012/0097466 | A1 | 4/2012 | Usami | |
| 2017/0001667 | A1* | 1/2017 | Ashraf | B60K 1/00 |
| 2018/0222535 | A1 | 8/2018 | Tanabe | |
| 2019/0002026 | A1 | 1/2019 | Ayukawa | |
| 2019/0023321 | A1* | 1/2019 | Ayukawa | B62D 21/03 |
| 2019/0359046 | A1 | 11/2019 | Tsuyuzaki | |
| 2020/0047811 | A1 | 2/2020 | Shimizu | |
| 2020/0079168 | A1* | 3/2020 | Suzuki | B60G 13/003 |
| 2020/0079201 | A1* | 3/2020 | Suzuki | B60K 1/00 |
| 2020/0079202 | A1 | 3/2020 | Suzuki | |
| 2020/0079433 | A1* | 3/2020 | Suzuki | B60K 1/04 |
| 2020/0083777 | A1* | 3/2020 | Tominaga | H02K 5/225 |
| 2020/0130495 | A1 | 4/2020 | Shimizu | |
| 2021/0300481 | A1* | 9/2021 | Jeong | B62D 25/04 |
| 2021/0316793 | A1* | 10/2021 | Chung | B62D 25/025 |

FOREIGN PATENT DOCUMENTS

| | | |
|---|---|---|
| JP | 2019-142421 | 8/2019 |
| KR | 10-2019-0084523 | 7/2019 |

* cited by examiner

BODY FOR VEHICLE

CROSS REFERENCE TO RELATED APPLICATION

The present application is a continuation-in-part of non-provisional U.S. patent application Ser. No. 17/028,903, filed Sep. 22, 2020 which claims priority to Korean Patent Application No. 10-2020-0035848, filed Mar. 24, 2020, the entire contents of which is incorporated herein for all purposes by this reference.

BACKGROUND OF THE INVENTION

Field of the Invention

The present invention relates to a body for a vehicle capable of securing safety performance and body rigidity according to collision of the vehicle while increasing a battery capacity mounted in the vehicle.

Description of Related Art

A low-capacity battery with a cruising distance of about 90 to 100 miles is mounted at a lower end portion of a center floor of an existing electric vehicle.

However, as an electric vehicle having a cruising distance of 200 miles or more is recently required, there is a need to increase the capacity of the battery.

Accordingly, it is possible to secure the cruising distance by increasing the volume of the battery by 1.5 times or more compared to the existing electric vehicle, but in the instant case, since most of the space under the body is used as a space for mounting the battery, it is difficult to construct a main member and a reinforcement material under the body. Therefore, with such a body structure alone, there was a problem that it is difficult to secure safety performance and body rigidity according to collision of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a body for a vehicle configured for securing safety performance and body rigidity according to collision of the vehicle while increasing a battery capacity mounted in the vehicle.

According to various exemplary embodiments of the present invention, a body for a vehicle includes: an internal side member mounted on a top surface of a center floor in a longitudinal direction of the body; a battery cross member mounted in a width direction of the body inside a battery case provided at a lower end portion of the center floor while intersecting the internal side member; and a coupling structure coupled to the battery case, the battery cross member, and the center floor at a point where the internal side member and the battery cross member intersect.

Alternatively or additionally, the body for a vehicle includes: a cross member connected between first and second external side members provided on a first side and a second side of the center floor in a width direction of the body while intersecting the internal side member; a battery cross member extending inside a battery case provided at a lower end portion of the center floor, wherein a direction in which the battery cross member extends is the same as a direction in which the cross member extends; and a coupling structure connecting the battery cross member, the battery case and the center floor at a lower portion of the cross member.

The coupling structure may be configured to connect the battery cross member, the battery case, the center floor and the cross member.

The body for a vehicle may further include a rear cross member mounted at the rear of the center floor adjacent to a portion where a rear end portion of a first column seat rail is mounted, and connected between left and right side sills on both sides of the center floor, wherein the internal side member is connected between a dash panel mounted in front of the center floor and the rear cross member.

In the coupling structure, a pipe-shaped spacer may be coupled while vertically penetrating through a lower end portion of the battery case, the battery cross member, and an upper end portion of the battery case, a groove-shaped spacer support portion recessed downward may be formed in a portion of the center floor at an upper end portion of the spacer such that the top surface of the spacer may be supported on the bottom surface of the spacer support portion, a head portion of a fixing bolt may be supported on a lower end portion of the spacer, and a body portion may penetrate through the spacer and the spacer support portion and may be fitted thereto, a fixing nut may be supported on the top surface of the spacer support portion while being fastened to an upper end portion of the fixing bolt, and the internal side member may be coupled to the top surface of the center floor in covering the upper end portion of the fixing bolt together with the spacer support portion.

In the coupling structure, a pipe-shaped spacer may be coupled while vertically penetrating through a lower end portion of the battery case, the battery cross member, and an upper end portion of the battery case, a groove-shaped spacer support portion recessed downward may be formed in a portion of the center floor at an upper end portion of the spacer such that the top surface of the spacer may be supported on the bottom surface of the spacer support portion, a head portion of a fixing bolt may be supported on a lower end portion of the spacer, and a body portion may penetrate through the spacer, the spacer support portion, and an internal side member and may be fitted thereto, a fixing nut may be supported on the top surface of the internal side member while being fastened to an upper end portion of the fixing bolt, and the internal side member may be coupled to the top surface of the center floor in covering an upper end portion of the spacer support portion.

The cross member may be mounted in front of the center floor adjacent to a portion where a front end portion of a first column seat rail is mounted, and connected in the left and right directions between right and left external side members provided on both sides of the center floor and the internal side member.

The external side member may be a side sill or an external side member coupled to the interior of the side sill in a front and rear direction thereof.

The internal side member may include: a first portion linearly formed in a longitudinal direction of the internal side member while a front end portion thereof is connected to a rear end portion of a front side member mounted in front of a dash panel; a second portion having a front end portion connected to a rear end portion of the first portion and formed to be bent toward the center portion of the body; and a third portion having a front end portion connected to a rear end portion of the second portion and linearly formed in the longitudinal direction to have a rear end portion connected to a front surface of a rear cross member.

In the second portion, a first inflection portion having a predetermined curvature toward the center portion of the body may be formed at a portion connected from the front end portion of the second portion to a middle end portion of the second portion, a second inflection portion having a curved shape toward the rear of the body may be formed at a portion connected from the middle end portion of the second portion to the rear end portion of the second portion, and the rear end portion of the second portion may be positioned inside the body than the front end portion of the second portion.

The end portion of the cross member may be coupled to a side surface of the second portion adjacent to the third portion.

The body for a vehicle may further include a side connecting member connected to cross members on both sides and connected between the internal side members on both sides in the right and left directions.

The body for a vehicle may further include a tunnel member connected in the front and rear direction between the side connecting member and the dash panel.

The body for a vehicle may further include a battery mounting member coupled to the outside of the battery case, and coupled to a lower end portion of a side sill.

The body for a vehicle may further include a cross member mounted in front of the center floor adjacent to a portion where a front end portion of a first column seat rail is mounted, and connected in the left and right directions while passing over the internal side member between right and left external side members provided on both sides of the center floor.

The body for a vehicle may further include a tunnel member connected in the front and rear direction between the cross member positioned between the internal side members of both sides and the dash panel.

The body for a vehicle may further include an external seat mounting bracket connected between the cross member and the external side member.

The body for a vehicle may further include an internal seat mounting bracket connected between the cross member and the side connecting member.

The body for a vehicle may further include a dash cross member mounted between a dash panel and the internal side member and having a side end portion outside the body connected to a lower end portion of an A pillar.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
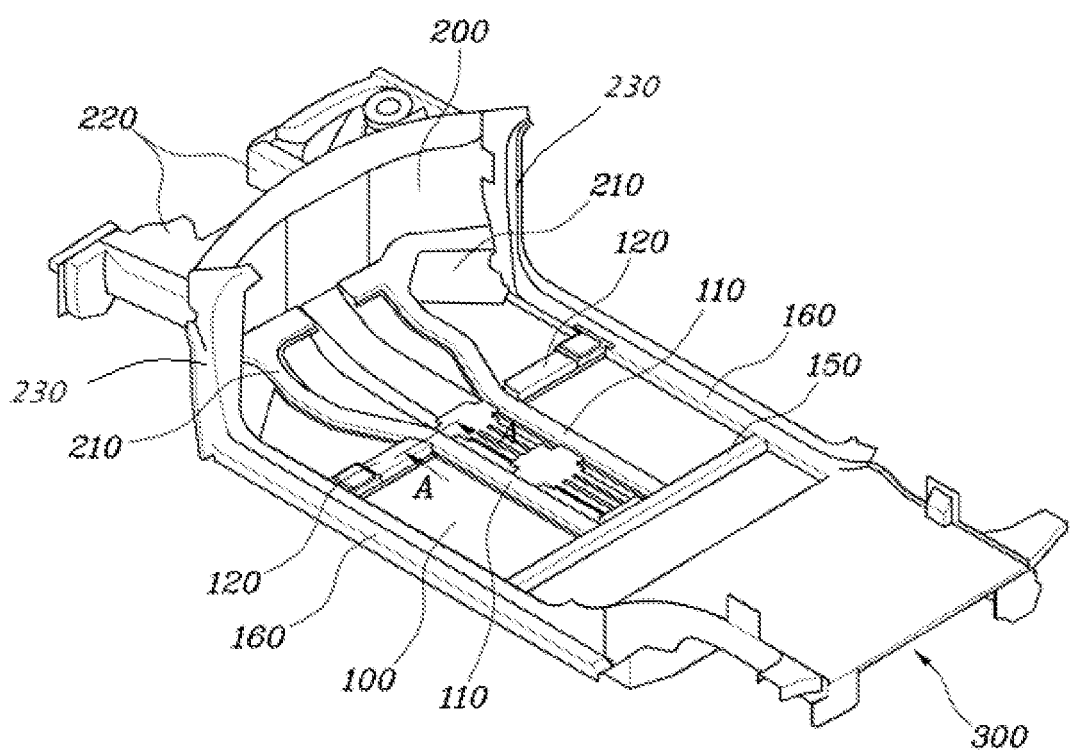
FIG. 1 is a view exemplarily illustrating a shape of a top surface of a center floor of a body for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail with reference to the accompanying drawings.

Figure 2:
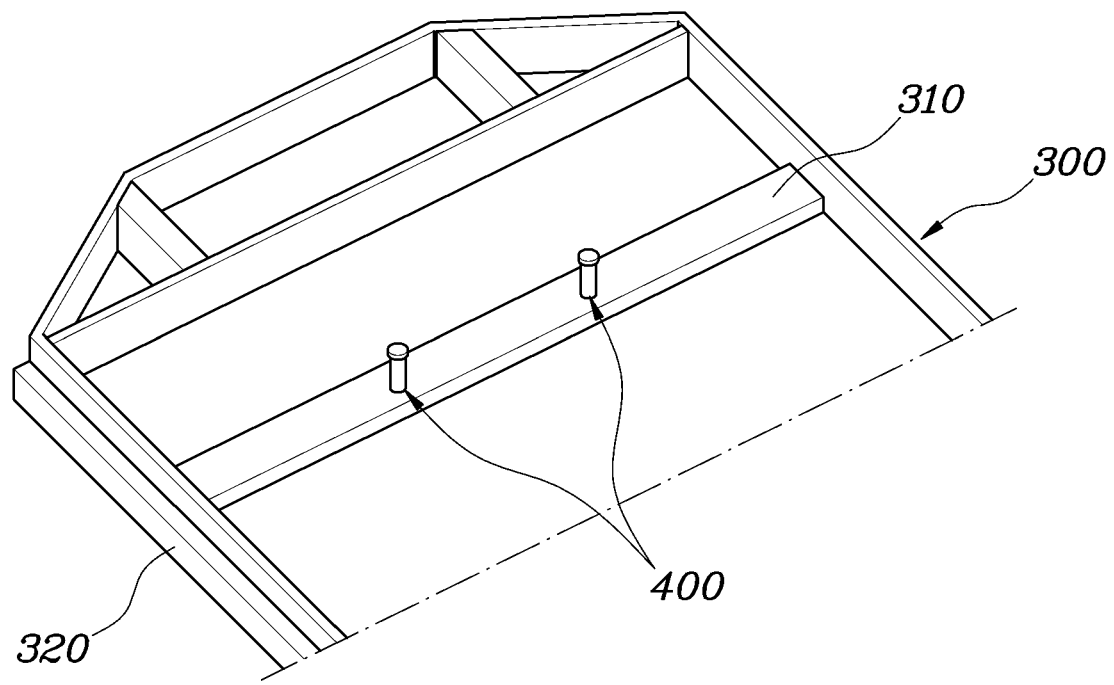
FIG. 2 is a view exemplarily illustrating an internal shape of a battery case according to various exemplary embodiments of the present invention.

FIG. 1 is a view exemplarily illustrating a shape of a top surface of a center floor 100 of a body for a vehicle according to various exemplary embodiments of the present invention and FIG. 2 is a view exemplarily illustrating an internal shape of a battery case 300 according to various exemplary embodiments of the present invention. A housing-shaped battery case 300 having a predetermined depth is coupled to a lower end portion of a center floor 100, and the front end portion and left and right sides of the battery case are formed to correspond to the front and left and right sides of the center floor 100 such that a high-voltage battery is mounted in the battery case 300.

Furthermore, an internal side member 110 is coupled to a top surface of the center floor 100 and a battery cross member 310 is provided in the battery case 300 such that the internal side member 110 and the battery cross member 310 are coupled to each other.

Referring specifically to the drawings, the internal side member 110 is mounted on the top surface of the center floor 100 in a front and rear direction of a body. At the instant time, the internal side member 110 may be respectively coupled to both sides based on a virtual center portion line with respect to the front and rear direction of the center floor 100.

The battery cross member 310 is mounted in a width direction of the body inside the battery case 300 provided at the lower end portion of the center floor 100 while intersecting the internal side member 110.

Furthermore, at points where the internal side members 110 and the battery cross member 310 intersect, the battery case 300, the battery cross member 310, and the center floor 100 may be coupled by coupling structures 400.

Here, the coupling structures 400 are configured to be coupled to the center floor 100. The coupling structures 400 may be directly coupled to the center floor 100. Alternatively or additionally, the coupling structures 400 may be indirectly coupled to the center floor 100 through load transmitting media such as various cross members and/or brackets.

That is, the battery case 300 is coupled to a width corresponding to the left and right widths of the center floor 100 and a battery is mounted inside the battery case 300, making it possible to increase battery capacity mounted in the vehicle.

At the time of a side collision of the vehicle, a collision load input to the center floor 100 and the battery case 300 is transferred to the battery cross member 310 and an impact force transferred to the battery cross member 310 is transferred to the internal side member 110 through the mechanically coupled coupling structure 400 and is dispersed back and forth of the internal side member 110, minimizing deformation of the body and the battery.

Therefore, since connection rigidity between the internal side member 110 and the battery cross member 310 is greatly improved to greatly improve the longitudinal bending and torsional performance of the member, the durability and rigidity of the body including the center floor 100 is increased, improving Noise Vibration Harshness (NVH) performance.

Figure 12:
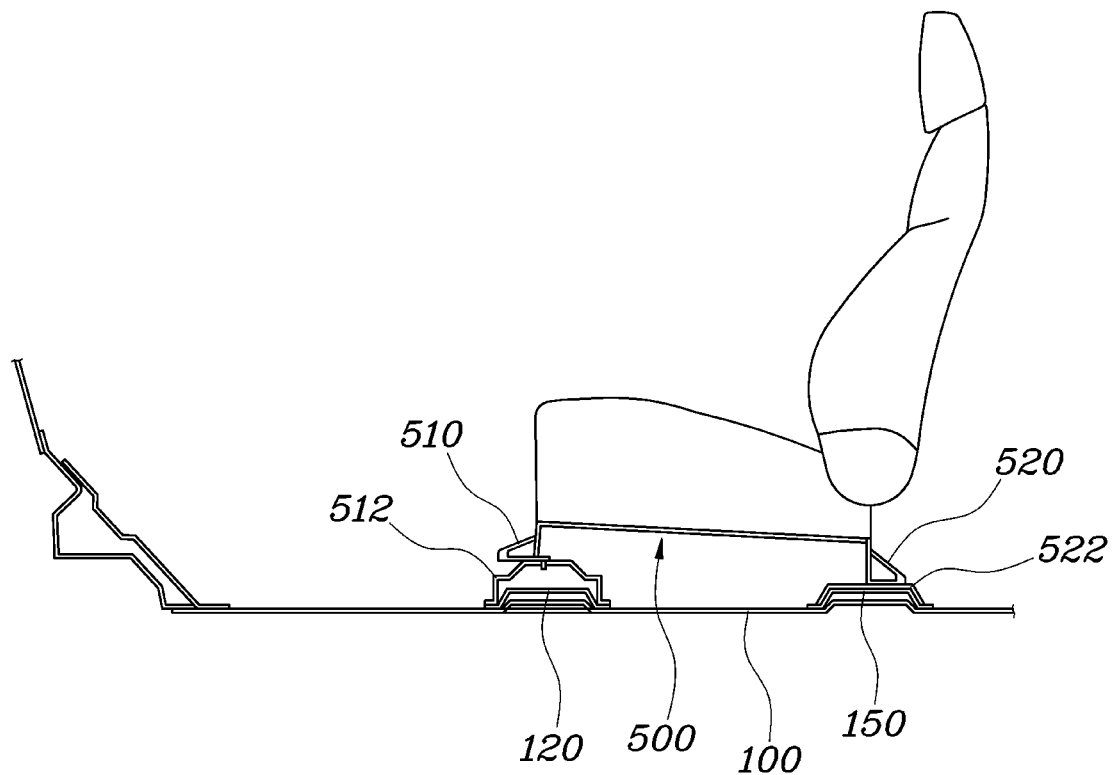
FIG. 12 is a view exemplarily illustrating a state in which a sheet is mounted on the center floor according to various exemplary embodiments of the present invention.

Furthermore, referring to FIGS. 1 and 12, a rear cross member 150 is mounted at the rear of the center floor 100 adjacent to a portion where a rear end portion 520 of a first column seat rail 500 is mounted, and the rear cross member 150 is connected between the left and right side sills 160 mounted on both sides of the center floor 100.

Furthermore, the internal side member 110 is connected between a dash panel 200 mounted in front of the center floor 100 and the rear cross member 150.

For example, the front end portion of the internal side member 110 is connected to the dash panel 200, and the rear end portion of the internal side member 110 is connected to a front surface of the rear cross member 150 coupled to the top surface of the center floor 100.

For reference, both end portions of the rear cross member 150 may be respectively coupled to the internal side surfaces of the side sills 160 coupled to both sides of the center floor 100. Furthermore, the rear end portion 520 of the first column seat rail 500 is directly mounted on the rear cross member 150, or a mounting bracket 522 is further coupled onto the rear cross member 150 such that the rear end portion 520 of the first column seat rail 500 may be mounted on the mounting bracket 522.

Figure 3:
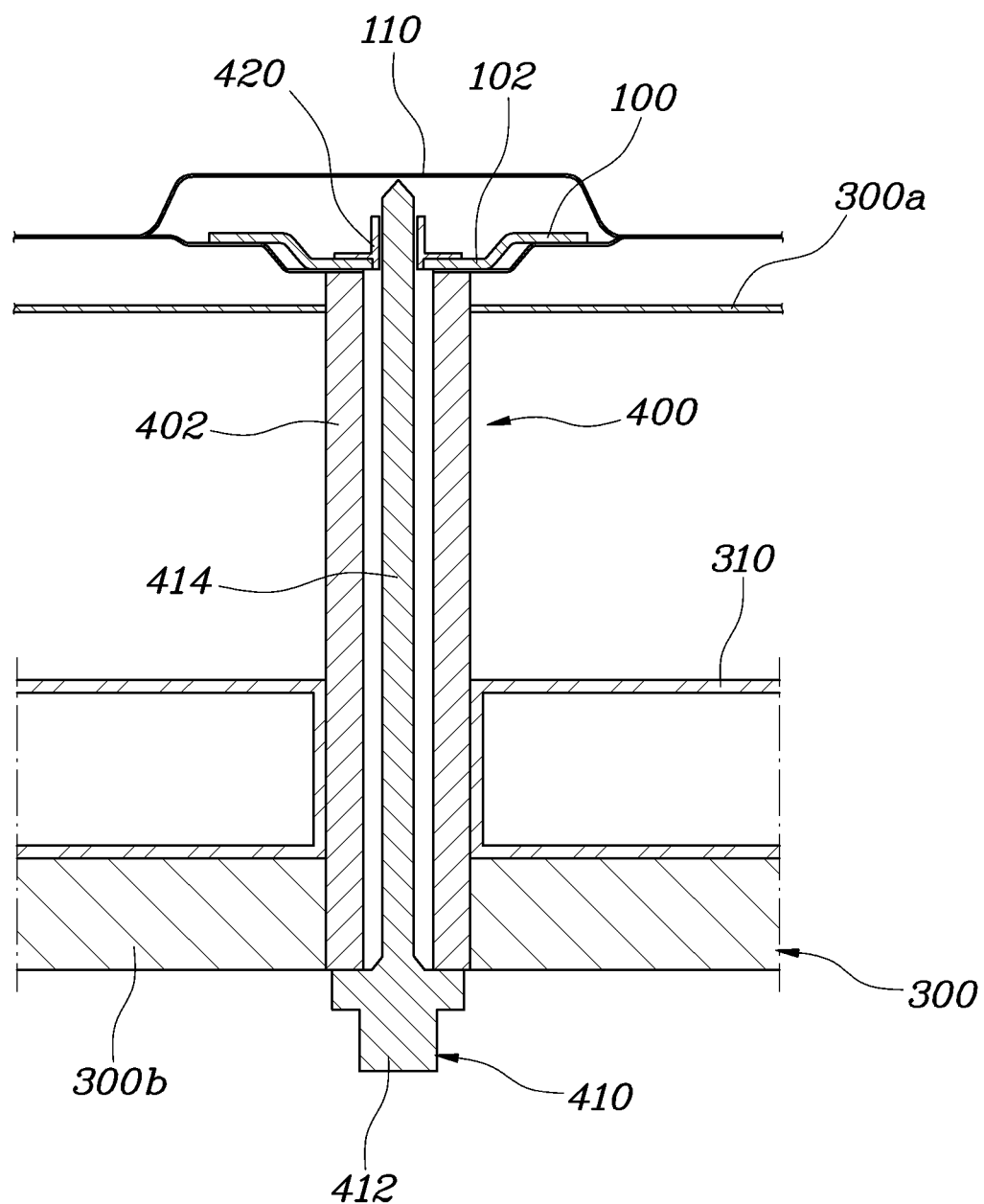
FIG. 3 is a cross section taken along line A-A in FIG. 1 and is a view for describing a configuration of a first example of a coupling structure for coupling an internal side member and a battery cross member.

Meanwhile, FIG. 3 is a cross section taken along line A-A in FIG. 2 and is a view for describing a configuration of a first example of a coupling structure 400 for coupling an internal side member 110 and a battery cross member 310.

A configuration of a first example of the coupling structure 400 will be described with reference to FIG. 3. The coupling structure 400 is vertically provided to penetrate through the battery case 300, the battery cross member 310, and the center floor 100 and is bolting-coupled to the top surface of the center floor 100.

A hollow pipe-shaped spacer 402 is coupled while vertically penetrating through a lower end portion 300b of the battery case 300, the battery cross member 310, and an upper end portion 300a of the battery case 300.

Furthermore, a groove-shaped spacer support portion 102 recessed downward is formed in a portion of the center floor 100 located at an upper end portion of the spacer 402 such that the top surface of the spacer 402 is supported on the bottom surface of the spacer support portion 102.

Furthermore, while a head portion 412 of the fixing bolt 410 is supported on a lower end portion of the spacer 402, a body portion 414 is provided to penetrate through the spacer 402 and the spacer support portion 102 from the bottom to the top portion and is fitted thereto, and a fixing nut 420 is supported on the top surface of the spacer support portion 102 while being fastened to an upper end portion of the fixing bolt 410.

At the present time, the internal side member 110 forms a 'U'-shaped cross section in which both sides are bent to the lower end portion along its front and rear longitudinal direction thereof. A center portion of the bottom surface of the internal side member 110 covers an upper end portion of the fixing nut 420 together with the spacer support portion 102, and both sides of the bottom surface of the internal side member 110 are respectively coupled to the top surface of the center floor 100. As a result, an upper end portion of the coupling structure 400 is coupled inside the internal side member 110.

Figure 4:
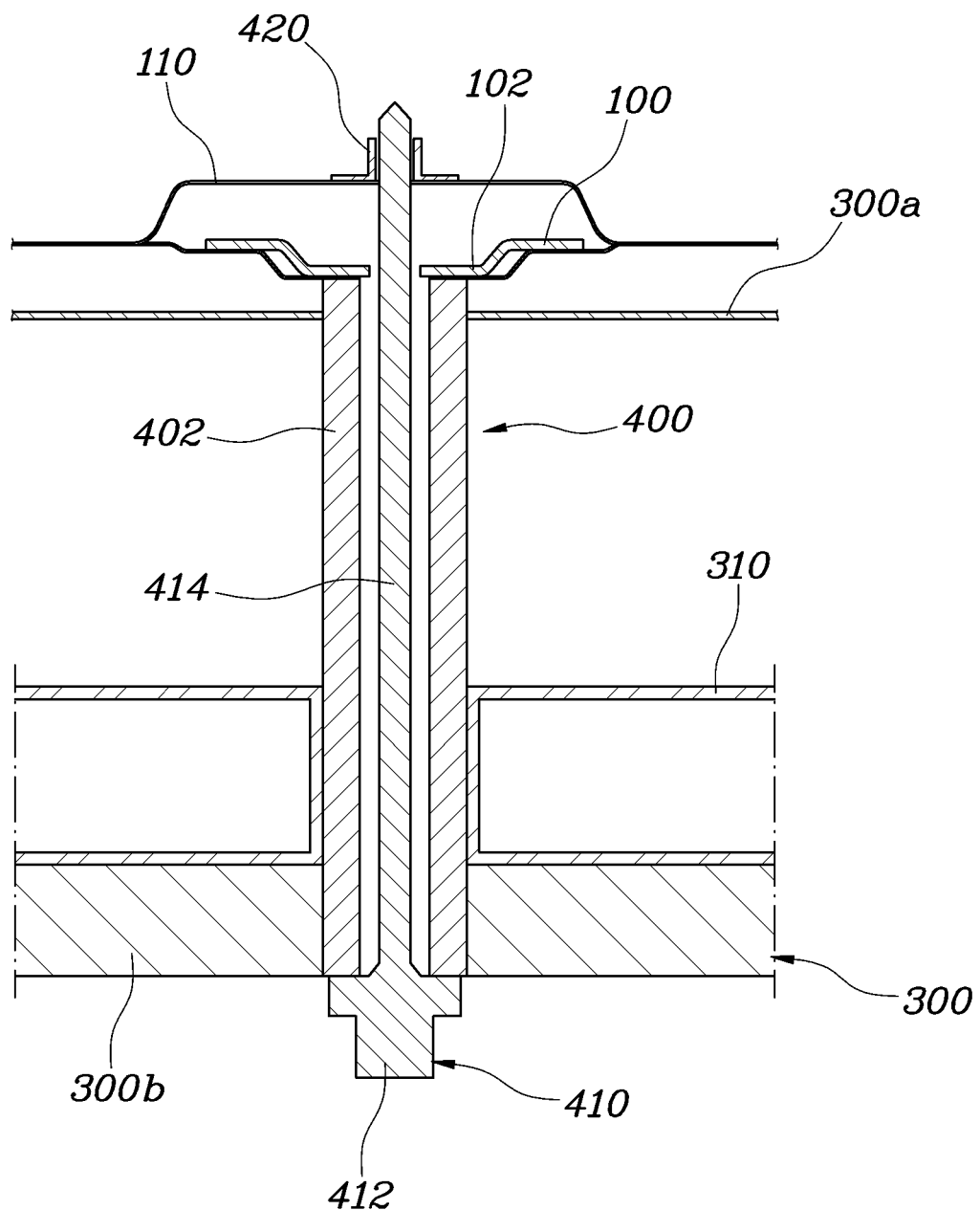
FIG. 4 is a cross section taken along line A-A in FIG. 1 and is a view for describing a configuration of a second example of a coupling structure for coupling an internal side member and a battery cross member.

Furthermore, FIG. 4 is a cross section taken along line A-A in FIG. 2 and is a view for describing a configuration of a second example of a coupling structure 400 for coupling an internal side member 110 and a battery cross member 310.

A configuration of a second example of the coupling structure 400 will be described with reference to FIG. 4. The coupling structure 400 vertically penetrates through the battery case 300, the battery cross member 310, the center floor 100, and the internal side member 110 and is bolting-coupled to the top surface of the internal side member 110.

A hollow pipe-shaped spacer 402 is coupled while vertically penetrating through a lower end portion 300b of the battery case 300, the battery cross member 310, and an upper end portion 300a of the battery case 300.

Furthermore, a groove-shaped spacer support portion 102 recessed downward is formed in a portion of the center floor 100 located at an upper end portion of the spacer 402 such that the top surface of the spacer 402 is supported on the bottom surface of the spacer support portion 102.

Furthermore, while a head portion 412 of the fixing bolt 410 is supported on a lower end portion of the spacer 402, a body portion 414 is provided to penetrate through the spacer 402, the spacer support portion 102, and the internal side member 110 from the bottom to the top portion and is fitted thereto, and a fixing nut 420 is supported on the top surface of the internal side member 110 while being fastened to an upper end portion of the fixing bolt 410.

At the present time, the internal side member 110 forms a 'U'-shaped cross section in which both sides are bent to the lower end portion along its front and rear longitudinal directions. The internal side member 110 is formed in a shape that covers the upper end portion of the spacer support portion 102, the fixing bolt 410 is provided to penetrate through the center portion of the bottom surface of the internal side member 110 and is fitted thereto, and both sides of the bottom surface of the internal side member 110 are respectively coupled to the top surface of the center floor 100. As a result, an upper end portion of the coupling structure 400 is coupled to the top surface of the internal side member 110.

Figure 5:
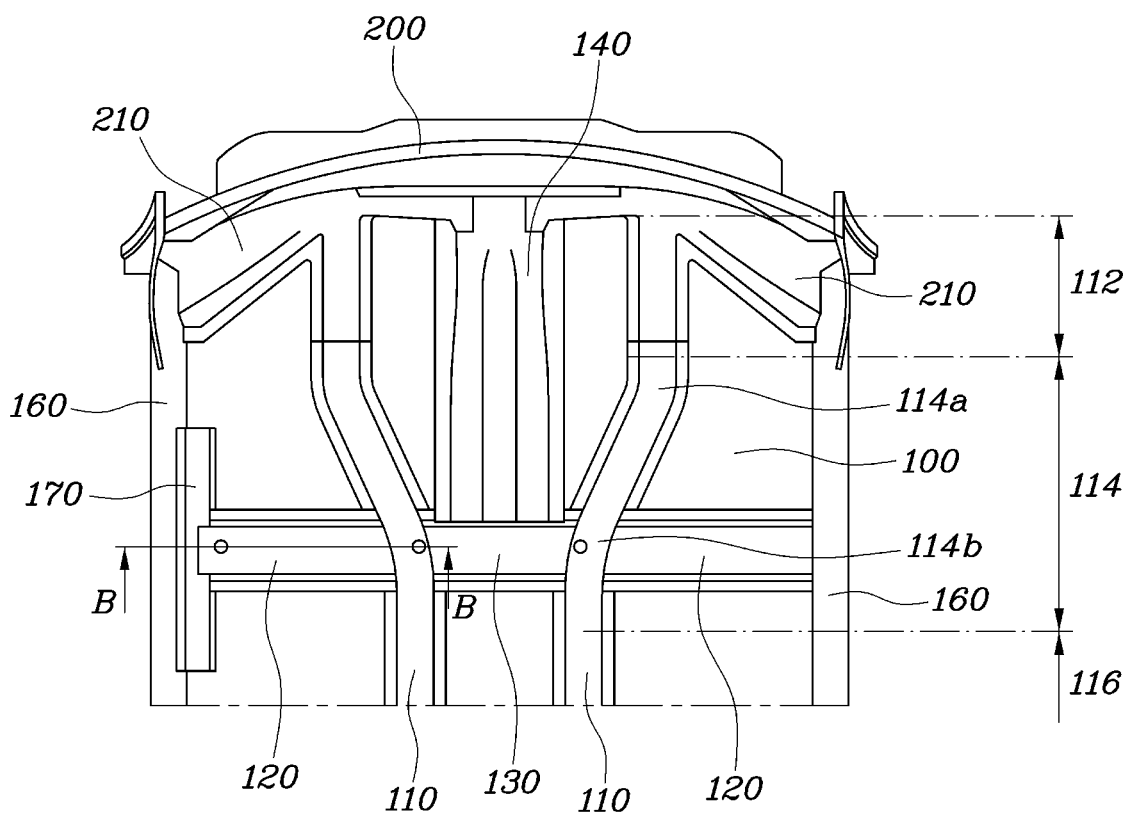
FIG. 5 is a view exemplarily illustrating a structure in which a cross member and a side connecting member are connected between internal side members according to various exemplary embodiments of the present invention.
Figure 6:
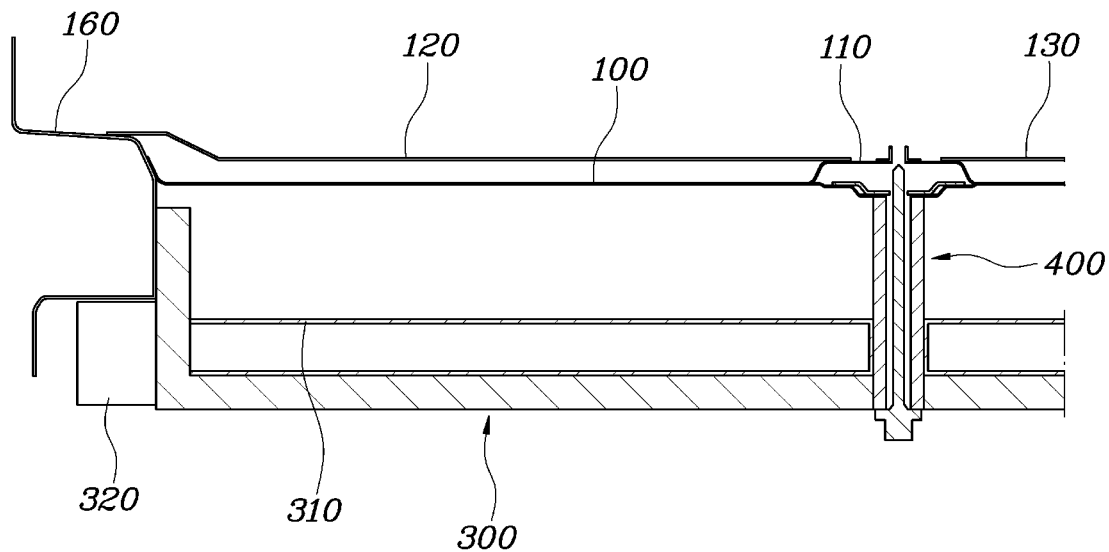
FIG. 6 is a cross-sectional view taken along line B-B in FIG. 5.

Meanwhile, FIG. 5 is a view exemplarily illustrating a structure in which a cross member 120 and a side connecting member 130 are connected between internal side members 110 according to various exemplary embodiments of the present invention and FIG. 6 is a cross-sectional view taken along line B-B in FIG. 5.

Referring to FIG. 5, a cross member 120 is mounted in front of the center floor 100 adjacent to a portion where the front end portion 510 of the first column seat rail 500 is mounted, and the cross member 120 is further connected in the right and left directions between right and left external side members provided on both sides of the center floor 100 and the internal side member 110.

For example, the cross member 120
forms a 'U'-shaped cross section in which both sides are bent to the lower end portion along its left and right longitudinal directions, and both sides of the bottom surface of the cross member 120 are coupled to the top surface of the center floor 100.

One end portion toward the outside of the body of both end portions of the cross member 120 is coupled to the internal side surface of the external side member, and the other end portion of the cross member 120 toward the center portion of the body is coupled to the external side surface of the internal side member 110.

The cross member 120 may be a seat cross member coupled to a seat rail of the vehicle. Alternatively or additionally, the cross member 120 may be a body cross member configured to generally extend in a width direction of the vehicle.

For reference, as illustrated in FIG. 12, the front end portion 510 of the first column seat rail 500 is directly mounted on the cross member 120, or a mounting bracket 512 is further coupled onto the cross member 120 such that the front end portion 510 of the first column seat rail 500 may be mounted on the mounting bracket 512.

Here, the external side member may be a side sill 160 or an external side member 170 coupled to the interior of the side sill 160 in the front and rear direction thereof.

That is, when the external side member 170 is additionally mounted on the internal side surface of the side sill 160, the left end portion of the cross member 120 is coupled to the internal side surface of the external side member 170 coupled to the interior of the left side sill 160, as in the cross member 120 illustrated on the left side of FIG. 5.

On the other hand, when the side member is not additionally mounted on the internal side surface of the side sill 160, the right end portion of the cross member 120 is directly coupled to the internal side surface of the right side sill 160, as in the cross member 120 illustrated on the right side of FIG. 5.

According to the structure as described above, at the time of a side collision of the vehicle, a collision load input to the center floor 100 and the battery case 300 is transferred to the cross member 120 and the battery cross member 310, and an impact load transferred to the cross member 120 is transferred to the internal side member 110 and is dispersed back and forth, minimizing deformation of the body and the battery.

Accordingly, by connecting a transversal end portion of the body and the internal side member 110 through the cross member 120, side collision safety is further improved.

Figure 13:
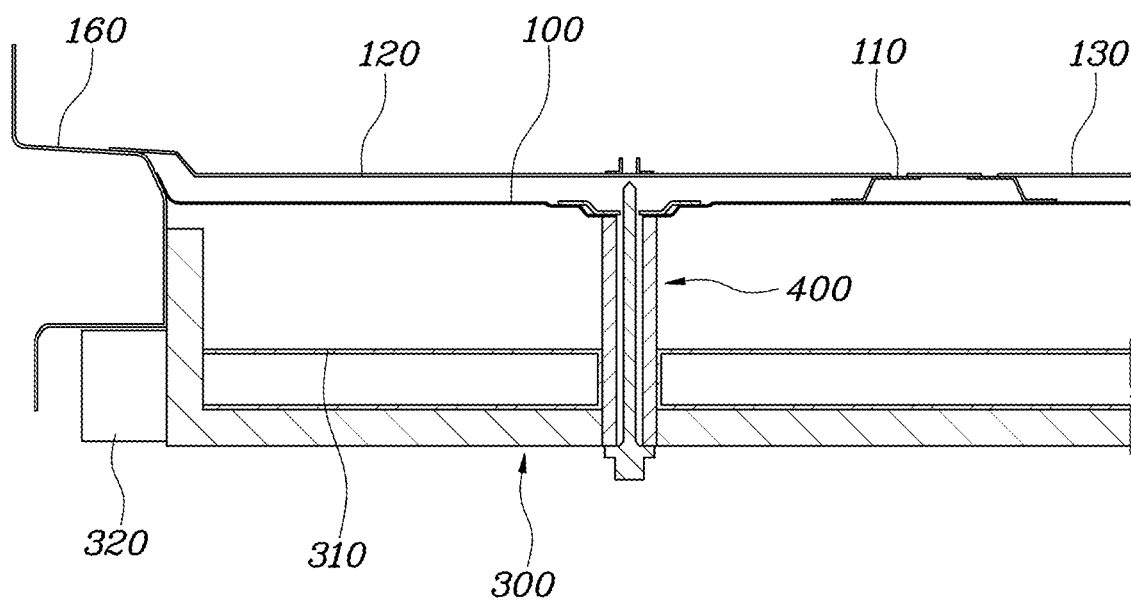
FIG. 13 and FIG. 14 are cross-sectional views taken along line B-B in FIG. 5.
Figure 14:
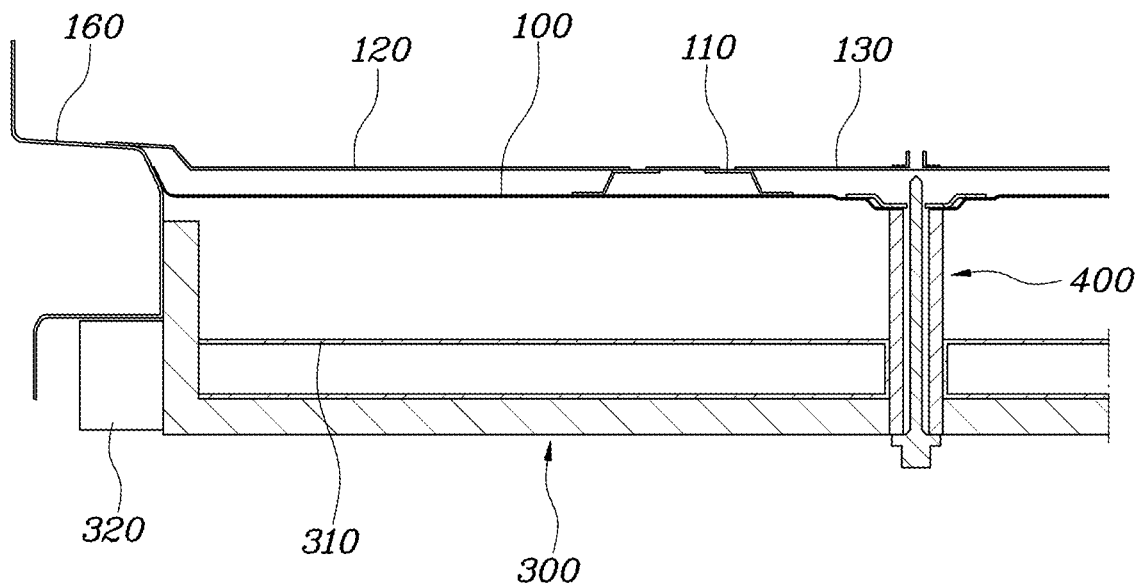

Meanwhile, FIG. 13 and FIG. 14 are cross-sectional views taken along line B-B in FIG. 5, illustrating still another exemplary embodiment of the present invention.

In an exemplary embodiment illustrated in FIG. 13, the battery cross member 310 and the battery case 300 may be coupled to the center floor 100 at a lower portion of the cross member 120 through the coupling structure 400. In this case, impact loads transferred to the cross member 120 and to the battery cross member 310 are transferred to the internal side member 110, such that the impact loads are dispersed in multiple dimensions (e.g., up and down, back and forth, and left and right). Therefore, deformation of the body and the battery can be minimized.

In an exemplary embodiment illustrated in FIG. 14, the battery cross member 310 and the battery case 300 may be coupled to the center floor 100 at a lower portion of the side connecting member 130 through the coupling structure 400. In this case, impact loads transferred to the cross member 120 and to the battery cross member 310 are transferred to the internal side member 110, such that the impact loads are dispersed in multiple dimensions (e.g., up and down, back and forth, and left and right). Therefore, deformation of the body and the battery can be minimized.

Furthermore, the cross member 120 may be connected to a curve forming section of the internal side member 110.

Referring to FIG. 5, the internal side member 110 may have an entire section divided into three sections, that is, a first portion 112, a second portion 114, and a third portion 116.

First, the first portion 112 is a section formed in a linear shape in the front and rear direction while a front end portion thereof is connected to the rear end portion of the front side member 220 mounted in front of the dash panel 200.

The second portion 114 is a section having a front end portion connected to a rear end portion of the first portion 112 and formed to be bent toward the center portion of the body.

The third portion 116 is a section having a front end portion connected to a rear end portion of the second portion 114 and linearly formed in the longitudinal direction to have a rear end portion connected to the front surface of the rear cross member 150.

That is, by configuring the front end portion of the internal side member 110 to be connected to the rear end portions of the left and right front side members 220, the rigidity of the internal side member 110 is increased to prevent deformation of the body and the battery.

A middle portion of the internal side member 110 is formed to be bent while forming a predetermined curvature, and is coupled to the center floor 100, and as a result, in addition to effectively dispersing the load transferred to the internal side member 110, it also helps to improve the rigidity of the body.

Furthermore, the second portion 114 of the internal side member 110 will be described in more detail. A first inflection portion 114*a* having a curved shape toward the center portion of the body is formed at a portion connected from the front end portion of the second portion 114 to the middle end portion of the second portion 114, and a second inflection portion 114*b* having a curved shape toward the rear of the body is formed at a portion connected from the middle end portion of the second portion 114 to the rear end portion of the second portion 114.

That is, the second portion 114 is formed in a convex curved shape toward the outside of the body from the first inflection portion 114*a* of the front end portion, and is then converted into a convex curved shape toward the interior of the body from the second inflection portion 114*b* of the rear end portion such that the entire second portion 114 is curved.

Furthermore, the rear end portion of the second portion 114 is positioned inside the body than the front end portion of the second portion 114, and the linear section of the third portion 116 is positioned inside the body compared to the linear section of the first portion 112.

Furthermore, the other end portion of the cross member 120 is coupled to a side surface of the second portion 114 adjacent to the third portion 116 of the internal side member 110.

That is, at the time of a side collision of the vehicle, the collision load input to the center floor 100 and the battery case is transferred to the internal side member 110 through the cross member 120 and dispersed along a curved path of the second portion 114, further improving a load dispersion effect. As a result, the rigidity of the body is improved to minimize the deformation of the body and the battery.

Meanwhile, referring to FIG. 5 and FIG. 6, a side connecting member 130 may be horizontally connected between the internal side members 110 on both sides at positions connected to the cross members 120 on both sides.

For example, the side connecting member 130 forms a 'U'-shaped cross section in which both sides are bent to the lower end portion along its left and right longitudinal directions, and both sides of the bottom surface of the side connecting member 130 are coupled to the top surface of the center floor 100.

Both end portions of the side connecting member 130 are respectively coupled to the internal sides of the internal side members 110 on both sides, and are configured to connect the cross members 120 coupled to both sides.

According to the structure as described above, in various exemplary embodiments of the present invention, by transversely connecting the cross members 120 coupled to both sides, the impact load transferred to the cross member 120 at the time of the side collision of the vehicle is transferred to an opposite cross member 120 through the internal side member 110 and the side connecting member 130. As a result, an impact absorption path is formed to be long, making it possible to more efficiently absorb the impact load.

Furthermore, as illustrated in FIG. 14, the coupling structure 400 may connect the battery cross member 310, the battery case 300 and the center floor 100 at a lower portion of the side connecting member 130. Alternatively or additionally, the coupling structure 400 may connect the battery cross member 310, the battery case 300, the center floor 100 and the side connecting member 130.

By such configurations according to exemplary embodiments of the present invention, at the time of a side collision of the vehicle, impact loads input to the center floor 100 and the battery case 300 may be transferred to the cross member 120 and to the battery cross member 310. In particular, the impact loads delivered to the cross member 120 may be dispersed in multiple dimensions (e.g., back and forth, and left and right). Therefore, deformation of the body and the battery can be minimized.

Furthermore, referring to FIG. 5, according to various exemplary embodiments of the present invention, a tunnel member 140 may be further connected in the front and rear direction between the side connecting member 130 and the dash panel 200.

For example, the tunnel member 140 also forms a 'U'-shaped cross section in which both sides are bent to the lower end portion along its left and right longitudinal directions, and both sides of the bottom surface of the tunnel member 140 are coupled to the top surface of the center floor 100.

A front end portion of the tunnel member 140 is coupled to a center portion of the rear surface of the dash panel 200, and a rear end portion of the tunnel member 140 is coupled to a front surface of the side connecting member 130.

That is, by additionally coupling the tunnel member 140 from the front end portion of the dash panel 200 to the side connecting member 130, the rigidity of the center floor 100 is increased, and thus it is possible to increase a noise, vibration, and harshness (NVH) performance as well as to secure a forward collision performance.

Furthermore, referring to FIG. 6, according to various exemplary embodiments of the present invention, a battery mounting member 320 is coupled to the outside of the battery case 300, and is coupled to the lower end portion of the side sill 160.

For example, the battery mounting member 320 is formed along a front and rear longitudinal direction in a beam shape having a quadrangular cross section, and a side surface of the battery mounting member 320 is coupled to an external side surface of the battery case 300, and the top surface of the battery mounting member 320 is coupled to the bottom surface of the side sill 160.

Accordingly, since the battery mounting member 320 is additionally coupled to the outside of the battery case 300, it is possible to more effectively absorb the impact load transferred to the battery case 300 at the time of the side collision of the vehicle.

Figure 7:
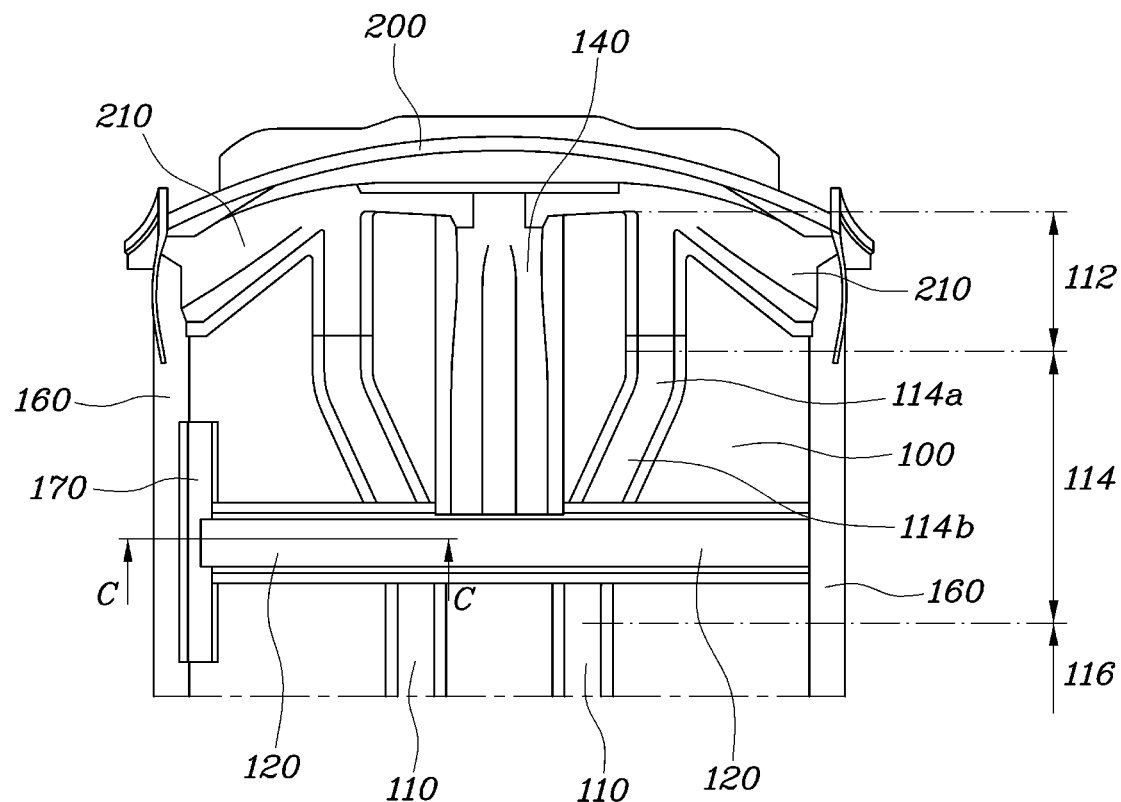
FIG. 7 is a view exemplarily illustrating another structure in which the cross member is connected while passing over the internal side member according to various exemplary embodiments of the present invention.
Figure 8:
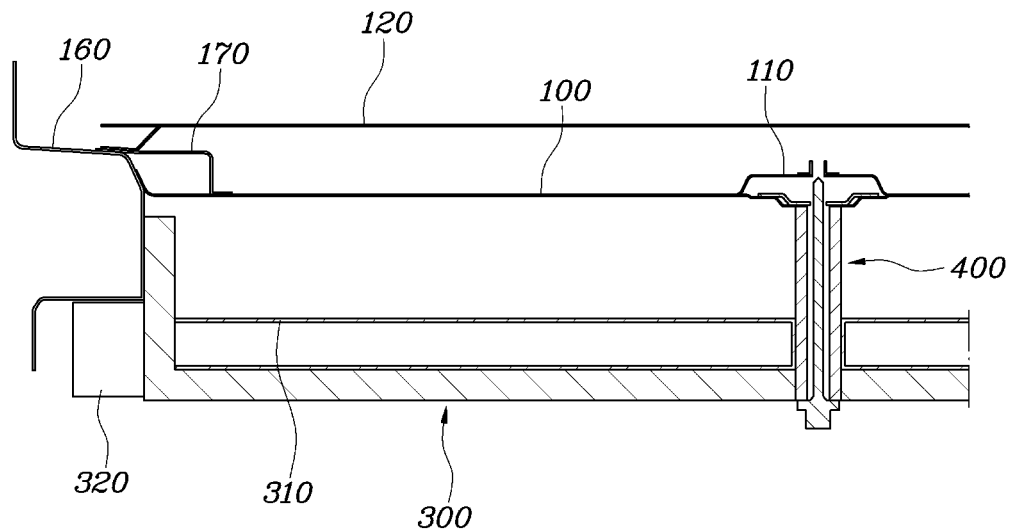
FIG. 8 is a cross-sectional view taken along line C-C in FIG. 7.

Meanwhile, FIG. 7 is a view exemplarily illustrating another structure in which the cross member 120 is connected while passing over the internal side member 110 according to various exemplary embodiments of the present invention and FIG. 8 is a cross-sectional view taken along line C-C in FIG. 7.

Referring to FIGS. 7 and 8, a cross member 120 is mounted in front of the center floor 100 adjacent to a portion where the front end portion 510 of the first column seat rail 500 is mounted, and the cross member 120 is further connected in the left and right direction while passing over the internal side members 110 between the right and left external side members provided on both sides of the center floor 100.

For example, the cross member 120 forms a 'U'-shaped cross section in which both sides are bent to the lower end portion along its left and right longitudinal directions, and both sides of the bottom surface of the cross member 120 are coupled to the top surface of the center floor 100.

One end portion of both end portions of the cross member 120 is coupled an to an internal side surface of the external side member on one side of the body, and the other end portion of both end portions of the cross member 120 is coupled an to an internal side surface of the external side member on the other side of the body.

Here, the external side member may be a side sill 160 or an external side member 170 coupled to the interior of the side sill 160 in the front and rear direction thereof.

That is, when the external side member 170 is additionally mounted on the internal side surface of the side sill 160, the left end portion of the cross member 120 is coupled to the internal side surface of the external side member 170 coupled to the interior of the left side sill 160, as illustrated on the left side of FIG. 7.

On the other hand, when the side member is not additionally mounted on the internal side surface of the side sill 160, the right end portion of the cross member 120 is directly coupled to the internal side surface of the right side sill 160, as illustrated on the right side of FIG. 7.

Such a structure is applicable to a case in which there is a margin in the height of the center floor 100 and it is necessary to secure additional rigidity, and since the cross member 120 is connected to be long in the right and left transverse directions while passing over the internal side member 110, the impact load may be effectively absorbed and the side collision safety may be secured.

Figure 15:
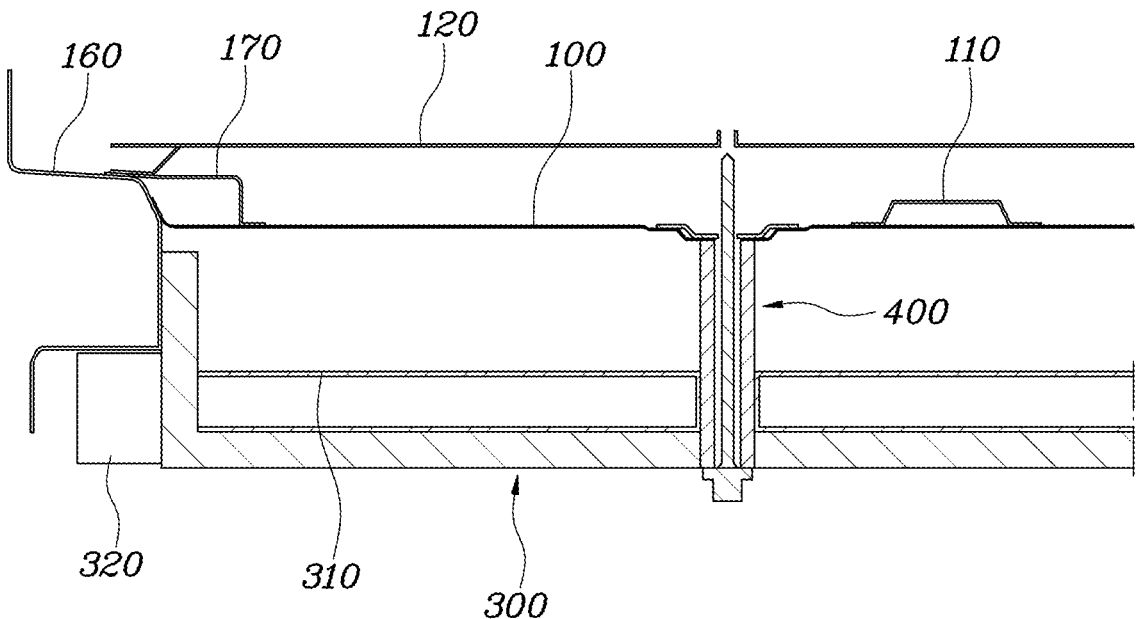
FIG. 15 and FIG. 16 are cross-sectional views taken along line C-C in FIG. 7.
Figure 16:
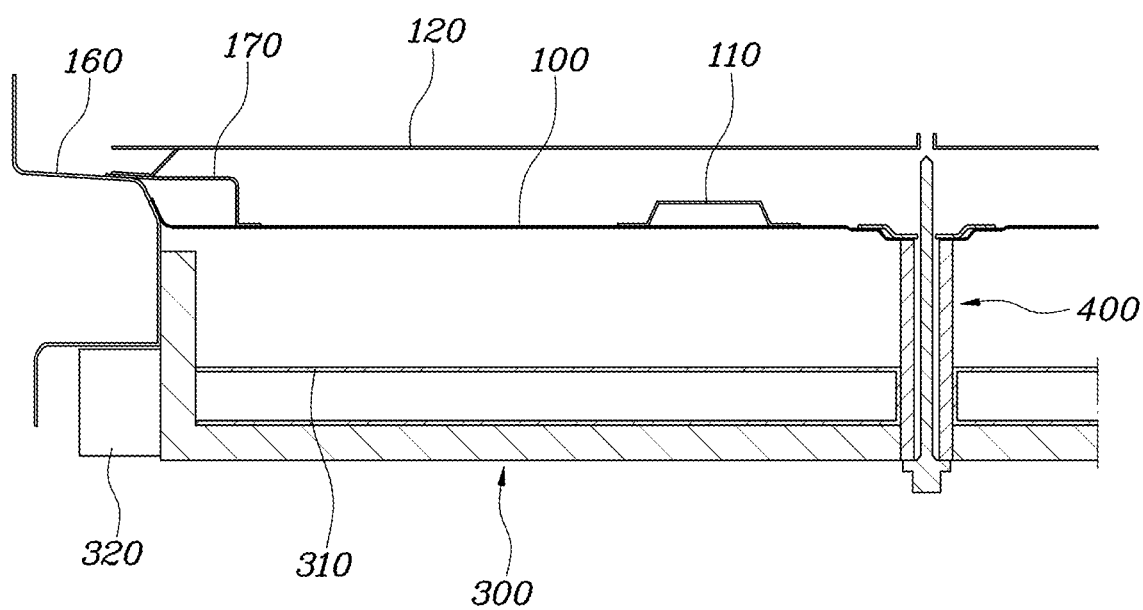

Meanwhile, FIG. 15 and FIG. 16 are cross-sectional views taken along line C-C in FIG. 7, illustrating still another exemplary embodiment of the present invention.

In an exemplary embodiment illustrated in FIG. 15, the battery cross member 310 and the battery case 300 may be coupled to the center floor 100 at a lower portion of the cross member 120 through the coupling structure 400. In this case, impact loads transferred to the cross member 120 and to the battery cross member 310 are transferred to the internal side member 110, such that the impact loads are dispersed in multiple dimensions (e.g., up and down, back and forth, and left and right). Therefore, deformation of the body and the battery can be minimized.

Meanwhile, referring to FIG. 7, according to various exemplary embodiments of the present invention, the tunnel member 140 may be further connected in the front and rear direction between the cross member 120 positioned between the internal side members 110 of both sides and the dash panel 200.

For example, the tunnel member 140 also forms a 'U'-shaped cross section in which both sides are bent to the lower end portion along its left and right longitudinal directions, and both sides of the bottom surface of the tunnel member 140 are coupled to the top surface of the center floor 100.

A front end portion of the tunnel member 140 is coupled to a center portion of the rear surface of the dash panel 200, and a rear end portion of the tunnel member 140 is coupled to a front surface of the center portion of the cross member 120.

That is, by additionally coupling the tunnel member 140 from the front end portion of the dash panel 200 to the cross member 120, the rigidity of the center floor 100 is increased, and thus it is possible to increase an noise, vibration, and harshness (NVH) performance as well as to secure a forward collision performance.

Figure 9:
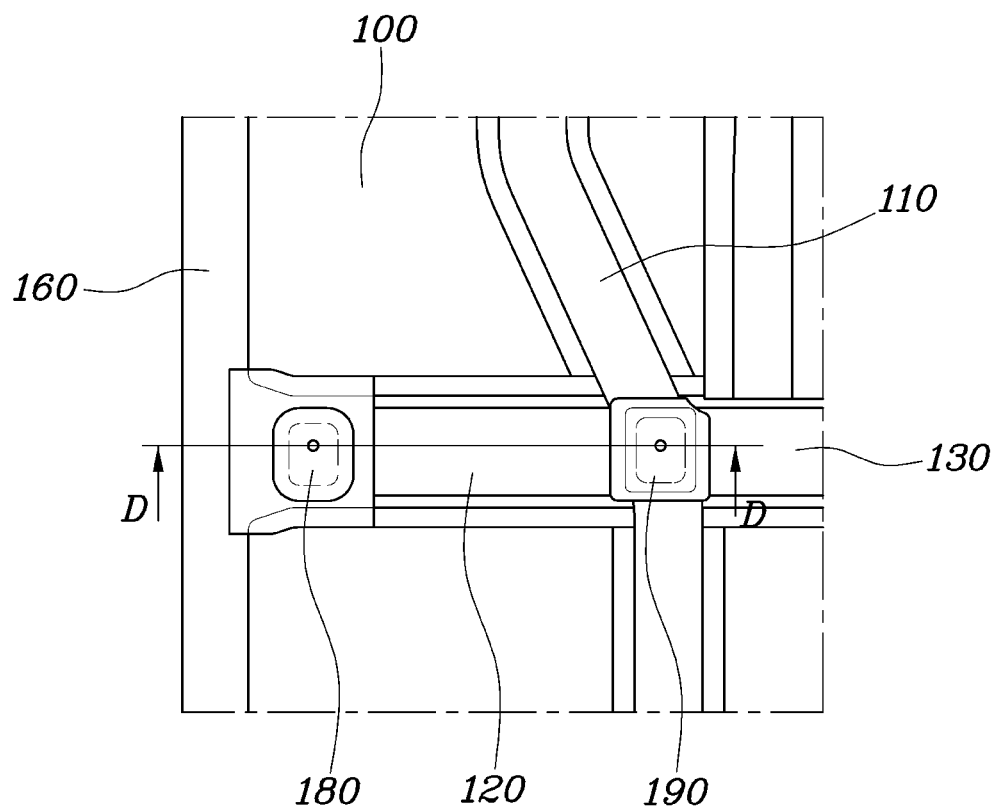
FIG. 9 is a view exemplarily illustrating a coupling structure of an external seat mounting bracket and an internal seat mounting bracket to secure connection rigidity of a cross member according to various exemplary embodiments of the present invention.
Figure 10:
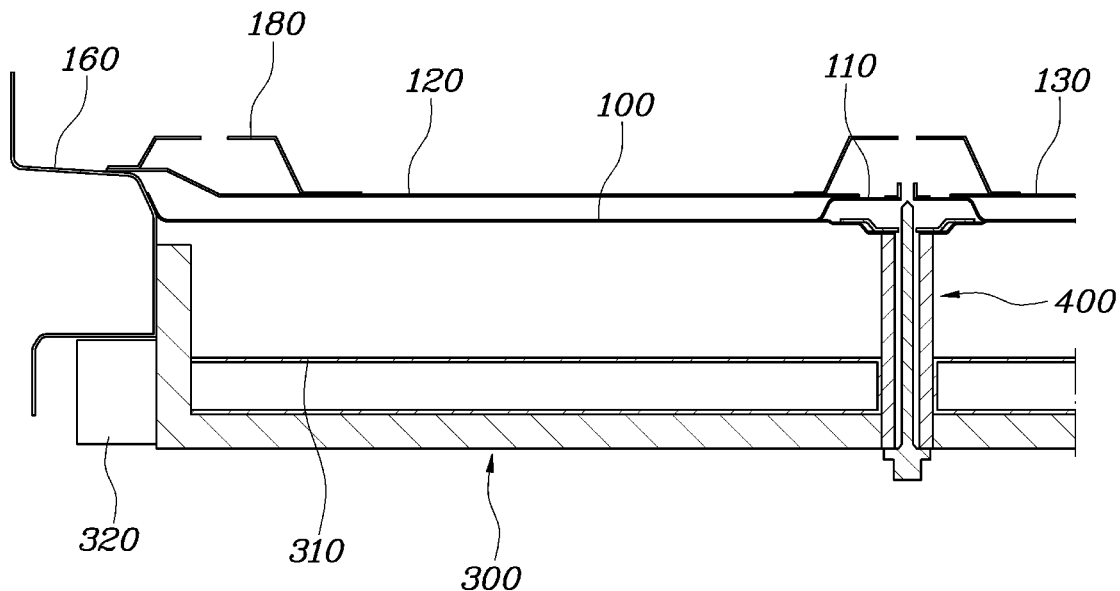
FIG. 10 is a cross-sectional view taken along line D-D in FIG. 9.

Meanwhile, FIG. 9 is a view exemplarily illustrating a coupling structure 400 of an external seat mounting bracket 180 and an internal seat mounting bracket 190 to secure connection rigidity of the cross member 120 according to various exemplary embodiments of the present invention and FIG. 10 is a cross-sectional view taken along line D-D in FIG. 9.

Referring to FIG. 9 and FIG. 10, an external seat mounting bracket 180 is connected between the cross member 120 and the external side member.

For example, the external seat mounting bracket 180 is positioned on the top surface of the end portion of the cross member 120, one end portion thereof is coupled to the top surface of the cross member 120, and the other end portion thereof is coupled to the top surface of the side sill 160 facing one end portion of the cross member 120.

That is, by more securely connecting the cross member 120 and the side sill 160 through the external seat mounting bracket 180, the connection rigidity between the members described above is strengthened to secure the side collision rigidity and the body rigidity.

Furthermore, an internal seat mounting bracket 190 is connected between the cross member 120 and the side connecting member 130 while passing over the internal side member 110.

For example, the internal seat mounting bracket 190 is positioned on the top surface of the internal side member 110 positioned between the cross member 120 and the side connecting member 130, one end portion thereof is coupled to the top surface of the cross member 120, and the other end portion thereof is coupled to the top surface of the side connecting member 130 facing the other end portion of the cross member 120.

That is, by more securely connecting the cross member 120 and the side connecting member 130 through the internal seat mounting bracket 190, the connection rigidity between the members described above is strengthened to secure the side collision rigidity and the body rigidity.

Figure 11:
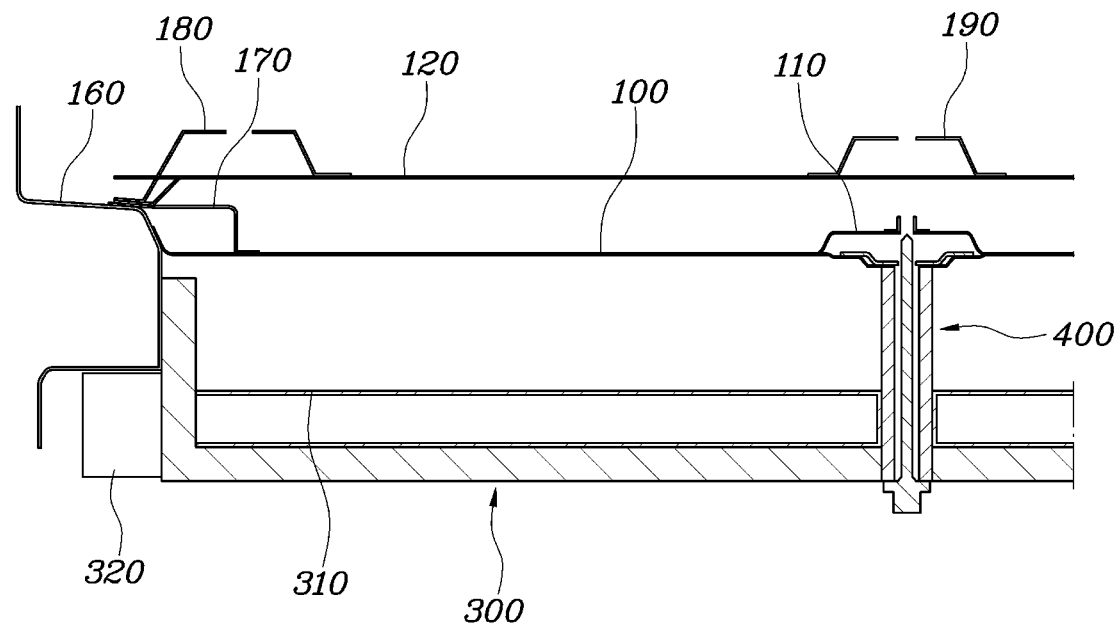
FIG. 11 is a view exemplarily illustrating a structure in which an external seat mounting bracket and an internal seat mounting bracket are applied to the structure of FIG. 8.

FIG. 11 is a view exemplarily illustrating a structure in which the external seat mounting bracket 180 and the internal seat mounting bracket 190 are applied to the structure of FIG. 8.

Referring to FIG. 8, since there is a margin in the height of the center floor 100, the cross member 120 is connected to be long in the right and left transverse directions while passing over the internal side member 110, and the external seat mounting bracket 180 is connected between the cross member 120 and the external side member.

For example, the external seat mounting bracket 180 is positioned on the top surface of the end portion of the cross member 120, one end portion thereof is coupled to the top surface of the cross member 120, and the other end portion thereof is coupled to the top surface of the side sill 160 facing one end portion of the cross member 120.

That is, by more securely connecting the cross member 120 and the side sill 160 through the external seat mounting bracket 180, the connection rigidity between the members described above is strengthened to secure the side collision rigidity and the body rigidity.

Furthermore, the internal seat mounting bracket 190 may be coupled to the top surface of the internal side member 110 intersecting the cross member 120.

Meanwhile, referring to FIG. 1, according to various exemplary embodiments of the present invention, a dash cross member 210 is connected between the dash panel 200 mounted in front of the center floor 100 and the internal side member 110. For example, a front surface of the dash cross member 210 is coupled to the lower end portion of the dash panel 200, and the front end portion of the internal side member 110 is connected to a rear surface of the dash cross member 210.

Furthermore, the dash cross members 210 are respectively coupled to both sides of the rear surface of the lower end portion of the dash panel 200, one end portion inside the body is connected to the side surface of the front end portion of the tunnel member 140, and the other end portion outside the body is connected to the interior of a lower end portion of an A pillar 230.

That is, the dash cross member 210 is connected in front of the internal side member 110, and the dash cross member 210 is connected to the tunnel member 140 and the pillar 230, the connection rigidity between the members and the body rigidity are improved to minimize the deformation of the body and the battery.

According to various exemplary embodiments of the present invention, since the battery is mounted inside the battery case provided at the lower end portion of the center floor, it is possible to increase the battery capacity, and at the time of a side collision of the vehicle, since the collision load input to the center floor and the battery case is transferred to the internal side member through members that are transversely coupled to the center floor and the battery case, and distributed in the front and rear direction thereof, it is possible to minimize deformation of the body and the battery by improving the connection rigidity between the members and the body rigidity.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A body for a vehicle, the body comprising:
   an internal side member mounted on a center floor in a longitudinal direction of the body;
   a cross member connected between first and second external side members provided on a first side and a second side of the center floor in a width direction of the body while intersecting the internal side member;
   a battery cross member extending inside a battery case provided at a lower end portion of the center floor, wherein a direction in which the battery cross member extends is the same as a direction in which the cross member extends; and
   a coupling structure connecting the battery cross member, the battery case and the center floor at a lower portion of the cross member.

2. The body of claim 1, wherein the coupling structure is configured to connect the battery cross member, the battery case, the center floor and the cross member.

3. The body of claim 1, further including a rear cross member mounted at a rear of the center floor adjacent to a portion where a rear end portion of a first column seat rail is mounted, and connected between first and second side sills on a first side and a second side of the center floor, respectively,
   wherein the internal side member is connected between a dash panel mounted in a front of the center floor and the rear cross member.

4. The body of claim 1, wherein in the coupling structure, a spacer is coupled while vertically penetrating through a lower end portion of the battery case, the battery cross member, and an upper end portion of the battery case,
   a spacer support portion recessed downward is formed in a portion of the center floor at an upper end portion of the spacer so that a top surface of the spacer is supported on a bottom surface of the spacer support portion,
   a head portion of a fixing bolt is supported on a lower end portion of the spacer, and a body portion of the fixing bolt is provided to penetrate through the spacer and the spacer support portion and is coupled to the spacer support portion,
   a fixing nut is supported on a top surface of the spacer support portion while being fastened to an upper end portion of the fixing bolt, and
   the internal side member is coupled to the top surface of the center floor in covering the upper end portion of the fixing bolt with the spacer support portion.

5. The body of claim 1, wherein in the coupling structure, a spacer is coupled while vertically penetrating through a lower end portion of the battery case, the battery cross member, and an upper end portion of the battery case,
   a spacer support portion recessed downward is formed in a portion of the center floor at an upper end portion of the spacer so that a top surface of the spacer is supported on a bottom surface of the spacer support portion,
   a head portion of a fixing bolt is supported on a lower end portion of the spacer, and a body portion of the fixing bolt is provided to penetrate through the spacer, the spacer support portion, and an internal side member and is coupled to the internal side member,
   a fixing nut is supported on a top surface of the internal side member while being fastened to an upper end portion of the fixing bolt, and
   the internal side member is coupled to the top surface of the center floor in covering an upper end portion of the spacer support portion.

6. The body of claim 1, wherein the cross member is mounted in a front of the center floor adjacent to a portion where a front end portion of a first column seat rail is mounted, and connected in the width direction of the body between the first and second external side members provided on the first side and the second side of the center floor while intersecting an upper portion of the internal side member.

7. The body of claim 6, wherein each of the first and second external side members is a side sill or an external side member coupled to the interior of the side sill in the longitudinal direction.

8. The body of claim 3, wherein the internal side member includes:
- a first portion linearly formed in a longitudinal direction of the internal side member while a front end portion thereof is connected to a rear end portion of a front side member mounted in a front of a dash panel;
- a second portion having a front end portion connected to a rear end portion of the first portion and formed to be bent toward a center portion of the body; and
- a third portion having a front end portion connected to a rear end portion of the second portion and linearly formed in the longitudinal direction of the internal side member to have a rear end portion connected to a front surface of a rear cross member.

9. The body of claim 8, wherein in the second portion, a first inflection portion having a predetermined curvature toward the center portion of the body is formed at a portion connected from the front end portion of the second portion to a middle end portion of the second portion,
a second inflection portion having a predetermined curvature toward a rear of the body is formed at a portion connected from the middle end portion of the second portion to a rear end portion of the second portion, and
the rear end portion of the second portion is disposed inside the body than the front end portion of the second portion.

10. The body of claim 7, further including a battery mounting member coupled to the outside of the battery case, and coupled to a lower end portion of the side sill.

11. The body of claim 3, further including a tunnel member connected in the longitudinal direction between the cross member disposed between internal side members at the first side and the second side and a dash panel.

12. The body of claim 6, further including an external seat mounting bracket connected between the cross member and the first and second external side members.

13. The body of claim 3, further including a dash cross member mounted between a dash panel and the internal side member and having a side end portion outside the body connected to a lower end portion of an A pillar.

* * * * *